United States Patent Office 3,689,429
Patented Sept. 5, 1972

3,689,429
DISPERSIONS OF OPTICAL BRIGHTENERS CONTAINING SALT-FORMING SOLUBILIZING GROUPS
Reinhold Deubel, Kelkheim, Taunus, Erich Schinzel, Hofheim, Taunus, Volker Hemmerling, Bad Soden, Taunus, and Günter Rösch, Altenhain, Taunus, Germany, assignors to Farbwerke Hoechst Aktiengesellschaft vormals Meister Lucius & Bruning, Frankfurt am Main, Germany
No Drawing. Continuation of abandoned application Ser. No. 784,464, Dec. 17, 1968. This application Apr. 15, 1971, Ser. No. 134,474
Int. Cl. D06l 3/12
U.S. Cl. 252—301.2 W                        6 Claims

ABSTRACT OF THE DISCLOSURE

Stable dispersions of optical brighteners having salt-forming solubilizing groups are obtained when using an anhydrous water-miscible di- or trihydric lower aliphatic alcohol, a lower alkyl or phenyl ether or a water-soluble polyether thereof as dispersing agent and dispersing medium. The use of a further non-ionic dispersing agent is optional.

These dispersions are preferred for continuous brightening processes because of their easy dosage and the avoiding of dust and dissolving manipulations.

---

This application is a continuation of Ser. No. 784,464, filed Dec. 17, 1968, now abandoned.

The present invention relates to stable dispersions of optical brighteners containing salt-forming solubilizing groups in an anhydrous water-miscible lower di- or trihydric aliphatic alcohol, a lower alkyl or phenyl ether or or water-soluble polyether thereof as dispersing agent and dispersing medium.

A further object of the invention is a continuous process for the optical brightening of fibrous materials using said dispersions.

The incorporation of powdery optical brighteners containing salt-forming solubilizing groups into treating baths for textile materials or paper is often difficult for the manufacturer because of the disagreeable dust formation upon use, the difficult dosage and the often too slow and insufficient dissolution in cold padding solutions. Especially in continuous processes which are now applied in increasing degree in the textile industry, it is important to be able to dose the optical brighteners rapidly and in a reproducible manner and to avoid the long and cumbersome process of dissolving the powder. These difficulties of incorporation are the reasons for the consumers' desire for optical brighteners in the form of liquid preparations.

British Pats. 986,338 and 1,000,825 describe liquid preparations in the form of highly concentrated aqueous solutions; these preparations are made from certain easily water-soluble hydroxyalkylammonium salts of stilbenesulfonic acid derivatives obtained by additional reaction steps.

German Pat. 1,206,296 discloses a process according to which aqueous solutions can be prepared after improval of the solubility of the optical brightener salts by addition of certain organic solubilizers that are miscible with water, for example polyhydric alhocols or their ethers, and easily water-soluble amides, for example, dimethylformamide. For preparing such highly concentrated solutions of optical brighteners, however, it is in every case necessary that the salts used have a sufficient solubility in water. This method is, therefore, restricted to a few special products, i.e. to determined hydroxyalkylammonium salts or to such salts of optical brighteners that contain a relatively great number of water-solubilizing groups (—SO$_3$H, —CH$_2$—OH).

Although many of the conventional optical brighteners, which are in most cases obtained in the form of alkali metal salts, are to a certain degree soluble in water, this solubility is in most cases insufficient to allow the preparation of solutions with sufficiently high concentration. In addition, such solutions have the disadvantage of being sensitive to low temperature, i.e. when stored at low temperatures the optical brightener salts crystallize out.

Now we have found that stable liquid preparations in form of dispersions of optical brighteners that contain salt-forming solubilizing groups can be obtained by dispersing the optical brightener, under exclusion of water, in polyhydric alcohols that are miscible with water and/or their ethers and/or their water-soluble polyethers.

As salt-forming solubilizing groups, there are to be understood in particular the carboxy and the sulfonic acid group. Acid esters of polyvalent acids, for example those of sulfuric acid or of phosphoric acid may also be used. Of course, the corresponding water-soluble salts, especially the corresponding alkali metal salts, the ammonium or amine salts are also implied.

The hydroxy compounds used as dispersing media and dispersing agents correspond to the general formula

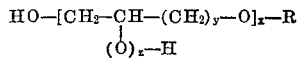

in which R represents a hydrogen atom, a lower alkyl group or a phenyl group, x stands for an integer from 1 to 50, y stands for 0 or 1 or 2 and z stands for 0 or 1.

As dispersing media, there may be used, for example, polyhydric alcohols such as ethylene glycol, propylene glycol, butylene glycol or glycerin; water-miscible ether alcohols such as ethylene glycol monomethyl-, monoethyl-, monopropyl-, monobutyl- or mono-phenyl-ethers, diethylene glycol, triethylene glycol, diethylene glycol monomethyl-, monoethyl- or monobutyl-ethers, dipropylene glycol, as well as water-soluble polyethylene glycols and polypropylene glycols having different molecular weights. Instead of using the compounds singly, mixtures thereof are often used with particular advantage. In addition, water-free non-ionic dispersants, for example oxethylated nonyl-phenol, may be used additionally for improving the dispersing effect.

The dispersions are prepared by treating the optical brighteners with the dispersing medium of the present invention in a suitable kneading or milling device until the particles have a size in the range of from about 0.5 to about 3 μm. The grinding or milling time may vary within wide limits and depends on the hardness of the grains of the optical brightener salt used. As dispersing devices, there are suitable, for example dispersion kneaders, ball mills or bead mills, the latter being particularly advantageous owing to their continuous operation.

The most favourable composition of the dispersions for grinding depends, on the one hand, on the dispersing device used, and, on the other hand, on the viscosity of the dispersing media, and may vary within wide limits. When effecting the dispersing process on bead mills and on emulsifying devices, it is of advantage to use about 10 to about 50% by weight of optical brightener, preferably between about 20 and about 40% by weight. When effecting it in a dispersion kneader, it is of advantage to adjust the content of solid optical brightener to about 60 and about 90% by weight in order to obtain an optimal dispersing action.

After the fine distribution, the dispersions may, of course, be adjusted by adding further quantities of dispersing medium to the concentration of optical brightener which is most favourable for the further operation.

As optical brighteners containing salt-forming water-solubilizing groups, there may be used, for example the derivatives of bis-triazinylamino-stilbene-disulfonic acid of the general formula

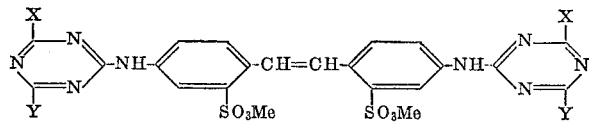

wherein X and Y represent an amino group, an alkoxy group or the radicals of primary or secondary, aliphatic, aromatic or heterocyclic amines which may contain salt-forming water-solubilizing groups, and Me represents hydrogen or a monovalent cation. Furthermore, there may also be used, according to the invention, pyrazoline derivatives of the general formula

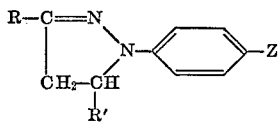

wherein R represents an aryl or styryl group which may be substituted, R' represents hydrogen, an alkyl or aryl group, and Z represents a sulfo group or the group $-SO_2-CH_2-CH_2-SO_3Me$, Me standing for hydrogen or a monovalent cation.

The optical brightener dispersions prepared according to the present invention are distinguished by an excellent stability of their fine distribution, which is maintained at elevated temperatures of up to about 50° C. as well as at freezing temperatures of down to about —20° C. The dispersions meet the consumers' requirements with regard to non-dusting and to easy dosage. They dissolve immediately in water. Thus, they allow the manufacture of absolute stable dispersions that have considerably higher concentration than those prepared from the corresponding solutions of the solid substance, which fact is of decisive importance especially for continuous processes. Moreover, the process for the manufacture of such liquid preparations of optical brighteners in the form of dispersions is generally applicable and is thus not limited to a few very easily soluble optical brightener salts as is the method of manufacture of liquid preparations via highly concentrated solutions.

The following examples illustrate the invention but they are not intended to limit it thereto; the parts and percentages being by weight.

EXAMPLE 1

50 parts of the pyrazoline derivative described in Belgian Pat. 631,367 and corresponding to the formula

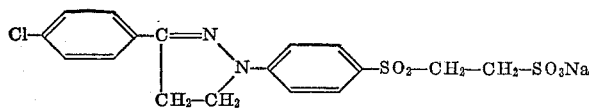

were ground for 3 hours while cooling with water in a laboratory bead mill having a capacity of 1 liter, in 150 parts of dipropylene glycol, with addition of about 600 parts of silicium quartzite beads (diameter 0.8 to 2 mm.). The particles of solid in dispersion then showed a size of 1–2 μm. The grinding bodies were removed by filtration with suction through a sieve, whereupon a stable dispersion was obtained that contained 25% by weight of optical brightener. With this dispersion, a solution of 20 parts of active substance in 1 liter of water, which was absolutely stable, could be easily prepared at 20° C. With a corresponding optical brightener powder, it was only possible to prepare at 20° C. a stable solution of 3 parts of active substance in 1 liter of water.

When using in the above example instead of the dipropylene glycol corresponding amounts of diethylene glycol, triethylene glycol, polyethylene glycol (molecular weight 200), polypropylene glycol (molecular weight 400) or glycerin, likewise stable optical brightener dispersions were obtained.

EXAMPLE 2

By working in the manner described in Example 1, but with 50 parts of the pyrazoline brightener and 65 parts of ethylene glycol, there was obtained after a 2 hours' grinding a stable dispersion containing 43 parts of active substance with a particle size of about 1 μm. The dispersion so obtained could be adjusted to a lower concentration by the addition of further ethylene glycol.

EXAMPLE 3

50 parts of the optical brightener mentioned in Example 1 were ground as indicated in the said example for 2 hours with 65 parts of ethylene glycol and, after completion of the fine distribution, 6.7 parts of polyethylene glycol having a molecular weight of 2000 were added. An optical brightener dispersion was obtained which contained 41% by weight of active substance and which could be diluted by the addition of further ethylene glycol. Instead of ethylene glycol, grinding can also be effected in ethylene glycol monomethyl-, monoethyl-, monopropyl- or monobutyl-ether, diethylene glycol monomethyl-, monoethyl- or monobutyl-ether, and then, polypropylene glycol having a molecular weight of 2400 may be added instead of polyethylene glycol.

EXAMPLE 4

150 parts of the pyrazoline brightener used in Example 1 were kneaded for 8 hours with 17 parts of polyethylene glycol having a molecular weight of 200, in a dispersion kneader having a capacity of 0.5 liter. The mass which contained 90% of active substance and presented a particle size of between 0.5 and 3 μm., could be further diluted to a well pourable dispersion by adding further amounts of polyethylene glycol.

EXAMPLE 5

60 parts of the stilbene derivative disclosed in German Pat. 814,901 and corresponding to the formula

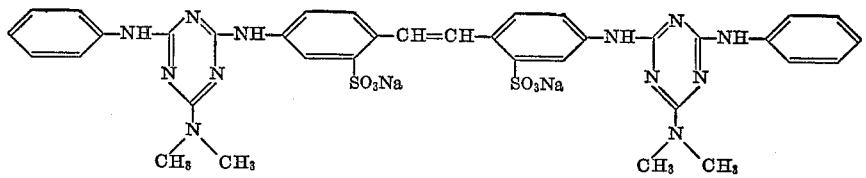

were ground for 2 hours in a laboratory bead mill in 160 parts of dipropylene glycol with addition of about 600 parts of silicium quartzite beads as grinding bodies. After separation of the grinding bodies, a dispersion was obtained that showed a particle size of between 0.5 to 2.5 μm. and could be easily incorporated into water.

EXAMPLE 6

When operating according to the method described in the Example 5 and using instead of the optical brightener mentioned in said example the optical brightener disclosed in German Pat. 814,903 having the following constitution

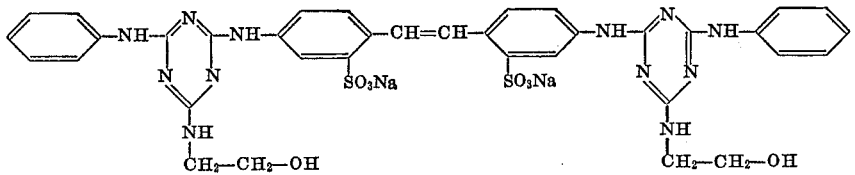

a corresponding optical brightener dispersion was obtained.

EXAMPLE 7

60 parts of the stilbene derivative of the formula

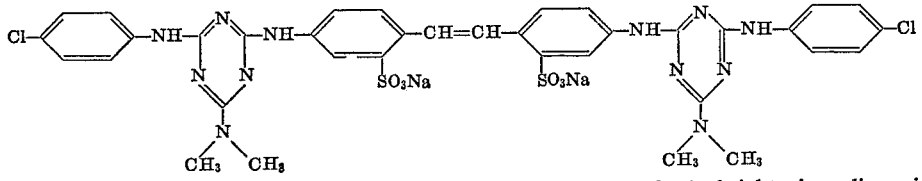

prepared according to the process described in German Pat. 870,263 were ground as described in Example 1 in 80 parts of ethylene glycol. An optical brightener dispersion was obtained which contained 43% by weight of active substance.

EXAMPLE 8

When operating in the manner described in Example 7 and using instead of the optical brightener mentioned in said example the optical brightener of the constitution

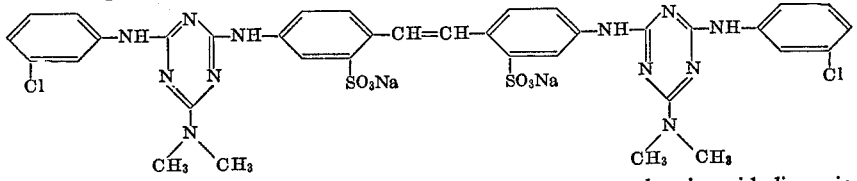

which can be prepared according to the process described in German Pat. 870,263, a stable optical brightener dispersion was likewise obtained.

EXAMPLE 9

50 parts of the stilbene derivative disclosed in German Pat. 859,313 and corresponding to the formula

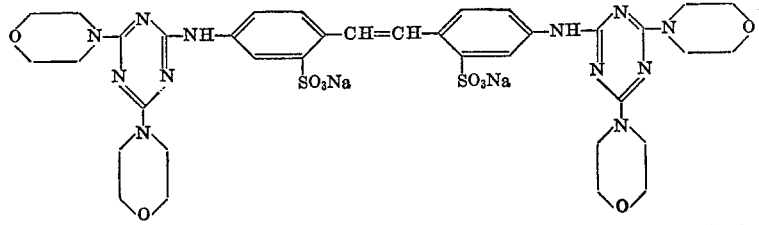

were ground as described in Example 1 with 145 parts of ethylene glycol and 5 parts of oxethylated nonyl phenol (containing on the average 9 mols of ethylene oxide) to a liquid preparation of the optical brightener in the form of a dispersion.

EXAMPLE 10

A knit fabric of polycaprolactam (polyamide 6) was impregnated with a bath containing 15 g./l. of a 16% dispersion of the optical brightener disclosed in Example 1 in dipropylene glycol and 0.3 g./l. of citric acid.

The textile material was squeezed between rollers until it still contained 70% of its dry weight of liquid and was then exposed for 20 seconds to 190° C. hot air. The knit fabric thus treated showed an excellent degree of whiteness having a violet tint.

What is claimed is:

1. An anhydrous optically brightening dispersion which comprises an optical brightener selected from the group consisting of water-soluble derivatives of bis-triazinyl-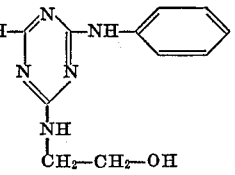amino-stilbene disulfonic acid and 1,3-diaryl-pyrazoline dispersed in an anhydrous water-miscible dispersing medium of a dihydric or a trihydric aliphatic alcohol, an ether of said alcohol or a polyether of said alcohol.

2. A brightening dispersion as defined in claim 1 wherein said dispersing medium is a liquid compound of the formula

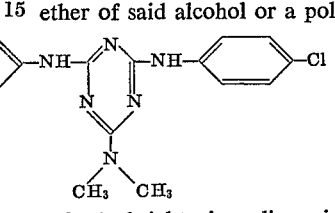

in which R is hydrogen, lower alkyl or phenyl, $x$ has a value from 1 to 50, $y$ has a value from 0 to 2 and $z$ has a value 0 or 1.

3. A brightening dispersion as defined in claim 1

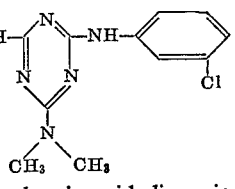

wherein said dispersion contains from 10% to 90% by weight of said brightener.

4. A brightening dispersion as defined in claim 1 which additionally contains an anhydrous non-ionic dispersing agent.

5. A brightening dispersion as defined in claim 1 wherein said brightener is a water-soluble derivative of

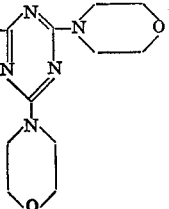

bis-triazinylamino-stilbene disulfonic acid.

6. A brightening dispersion as defined in claim 1 wherein said brightener is a water-soluble derivative of 1,3-diaryl-pyrazoline.

References Cited

UNITED STATES PATENTS

| | | | |
|---|---|---|---|
| 2,791,564 | 5/1957 | Fleck | 252—301.2 |
| 3,025,242 | 3/1962 | Seyler | 252—301.3 |
| 3,314,994 | 4/1967 | Schubert et al. | 260—566 |
| 3,346,322 | 10/1967 | Finkenauer et al. | 8—79 |
| 3,357,988 | 12/1967 | Hausermann et al. | 260—310 |
| 3,360,479 | 12/1967 | Hausermann | 252—301.2 |

TOBIAS E. LEVOW, Primary Examiner

A. P. DEMERS, Assistant Examiner

U.S. Cl. X.R.

117—33.5 T

UNITED STATES PATENT OFFICE
CERTIFICATE OF CORRECTION

Patent No. 3,689,429              Dated September 5, 1972

Inventor(s) Reinhold Duebel et al.

It is certified that error appears in the above-identified patent and that said Letters Patent are hereby corrected as shown below:

In the Heading:

After "Ser. No. 134,474," insert

--Claims priority, application Germany, December 23, 1967,

P 15 94 854.6--.

Signed and sealed this 23rd day of January 1973.

(SEAL)
Attest:

EDWARD M.FLETCHER,JR.                ROBERT GOTTSCHALK
Attesting Officer                    Commissioner of Patents